US 9,969,509 B2

(12) United States Patent
Mistral et al.

(10) Patent No.: US 9,969,509 B2
(45) Date of Patent: May 15, 2018

(54) KNOCK PREVENTION DEVICE FOR UNFURLING STRUCTURE (71) Applicant: THALES, Neuilly-sur-Seine (FR)

(72) Inventors: Alain Mistral, Cannes la Bocca (FR); Silvain Legrand, Nice (FR); Gael Blons, Cannes (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 14/572,947

(22) Filed: Dec. 17, 2014

(65) Prior Publication Data
US 2015/0166199 A1 Jun. 18, 2015

(30) Foreign Application Priority Data

Dec. 18, 2013 (FR) ...................... 13 02977

(51) Int. Cl.
E05F 5/02 (2006.01)
B64G 1/22 (2006.01)
F16F 1/44 (2006.01)
B64G 1/44 (2006.01)
B64G 1/66 (2006.01)
F16F 1/373 (2006.01)

(52) U.S. Cl.
CPC ............. B64G 1/222 (2013.01); F16F 1/445 (2013.01); B64G 1/44 (2013.01); B64G 1/66 (2013.01); F16F 1/3737 (2013.01); F16F 2228/08 (2013.01)

(58) Field of Classification Search
CPC ..... Y10T 16/61; Y10T 16/625; Y10T 16/628; Y10T 16/6285; Y10T 16/629; E05F 5/00; E05F 5/02; E05F 5/022; E05F 5/003; E05F 5/06; E05F 5/08; E05F 5/10; E05Y 2201/24; E05Y 2201/212; A47B 2210/0018; B65G 69/001
See application file for complete search history.

(56) References Cited

U.S. PATENT DOCUMENTS 1,880,190 A * 10/1932 Anderson ................ E05F 5/06
16/86 A
3,606,211 A 9/1971 Roersch et al.
4,426,053 A 1/1984 Chenin et al.
(Continued)

FOREIGN PATENT DOCUMENTS

DE 2457173 A1 * 6/1976 ................ E05F 5/02
DE 3401427 A1 * 7/1985 ................ E05F 5/08
(Continued)

Primary Examiner — Chuck Mah
(74) Attorney, Agent, or Firm — Baker & Hostetler LLP (57) ABSTRACT A structure comprises at least two unfurling panels and a spacing and knock prevention device intended to prevent the panels from knocking together when they are furled against one another. The knock prevention device comprises a holder fixed to the first panel, a cap forming a buffer against which the second panel bears in a bearing direction, and a damper disposed in a space formed between the holder and the cap. The cap and the holder form two elements. A first of the two elements comprises at least one lug. The second of the two elements comprises at least one housing intended to receive the lug. The cap is configured such that the lug passes into the housing by elastic deformation of the cap.

12 Claims, 5 Drawing Sheets (56) References Cited

U.S. PATENT DOCUMENTS

| | | | | |
|---|---|---|---|---|
| 4,494,273 | A | * | 1/1985 | Straus .................... E05F 1/1223 16/278 |
| 4,725,025 | A | | 2/1988 | Binge et al. |
| 5,086,541 | A | | 2/1992 | Auternaud et al. |
| 5,806,908 | A | * | 9/1998 | Kim ....................... B62D 33/03 16/85 |
| 6,039,388 | A | * | 3/2000 | Choi ....................... E05F 5/022 16/86 R |
| 8,052,233 | B2 | * | 11/2011 | Netzer .................... A47B 88/04 16/85 |
| 8,151,414 | B2 | | 4/2012 | Baudasse et al. |
| 2003/0173467 | A1 | | 9/2003 | Ozawa et al. |
| 2007/0271732 | A1 | * | 11/2007 | Bantle ...................... E05F 5/02 16/84 |
| 2009/0094789 | A1 | * | 4/2009 | Bereznai ................... E05F 5/10 16/84 |
| 2009/0307869 | A1 | * | 12/2009 | Salice ................. A47B 88/0477 16/85 |
| 2011/0252599 | A1 | * | 10/2011 | Kutschat ................. E05C 17/46 16/82 |
| 2011/0273065 | A1 | * | 11/2011 | Dickey .................... A47F 3/043 312/138.1 |

FOREIGN PATENT DOCUMENTS

| | | | |
|---|---|---|---|
| EP | 0059673 | A1 | 9/1982 |
| FR | 2596205 | A1 | 9/1987 |
| FR | 2635077 | A1 | 2/1990 |
| FR | 2902763 | A1 | 12/2007 |

* cited by examiner

KNOCK PREVENTION DEVICE FOR UNFURLING STRUCTURE

CROSS-REFERENCE TO RELATED APPLICATION

This application claims priority to foreign French patent application No. FR 1302977, filed on Dec. 18, 2013, the disclosure of which is incorporated by reference in its entirety.

FIELD OF THE INVENTION

The invention relates to a structure comprising at least two unfurling panels and a spacing and knock prevention device intended to prevent the panels from knocking together when they are furled against one another.

The invention is more particularly although not exclusively applicable to the field of space and notably to solar panel or flat antenna structures of satellites, said structures being formed of various panels articulated together and which are deployed in space. Numerous other applications can be envisaged both in the field of space and on the earth.

BACKGROUND

The panels are articulated to one another by means of self-propelled articulations such as those described for example in patent applications FR 2 635 077 and FR 2 902 763. In the furled position, before and during launch of the satellite, ties keep the panels furled against one another. When the satellite is deployed into space, the ties are released, thus allowing the structure to unfurl.

In the furled position, notably when the satellite is being launched, the structure is subjected to numerous mechanical stresses such as vibrations. The solar panels or the flat antenna elements are often of large size and the vibrations may cause adjacent panels to knock together, potentially leading to damage such as cracking or even breakages.

In order to limit these risks, spacing and damping knock prevention devices may be arranged, notably at the corners of the panels, to prevent the panels from knocking together. These devices are fixed to a first panel and an adjacent second panel rests against the knock prevention devices when the structure is in the furled position.

This solution is lengthy and tricky to implement. In addition, deployment anomalies occur because the knock prevention device sticks to the panel against which the device rests.

SUMMARY OF THE INVENTION

The invention seeks to alleviate all or some of the abovementioned problems by proposing to simplify and to facilitate the production of the knock prevention device.

It is therefore an object of the present invention to provide a structure comprising at least two unfurling panels and a knock prevention device intended to prevent the panels from knocking together when they are furled against one another, wherein the knock prevention device comprises a holder fixed to the first panel, a cap forming a buffer against which the second panel bears in a bearing direction, and a damper disposed in a space formed between the holder and the cap, wherein the cap and the holder form two elements, wherein a first of the two elements comprises at least one lug, wherein the second of the two elements comprises at least one housing intended to receive the lug, and wherein the cap is configured such that the lug passes into the housing by elastic deformation of the cap.

BRIEF DESCRIPTION OF THE DRAWINGS

The invention will be better understood and further advantages will become apparent from reading the detailed description of one embodiment provided by way of example, said description being illustrated by the attached drawing in which.

For the sake of clarity, the same elements will bear the same references in the various figures.

DETAILED DESCRIPTION

The invention is particularly useful in a structure designed for the deployment of panels installed on-board a satellite. The invention can also be implemented on the earth, for example for a deployable antenna intended to be transported to various sites in order to be used. Transport between the various use sites requires that the antenna be furled, and it is used in the deployed state.

Figure 1A:
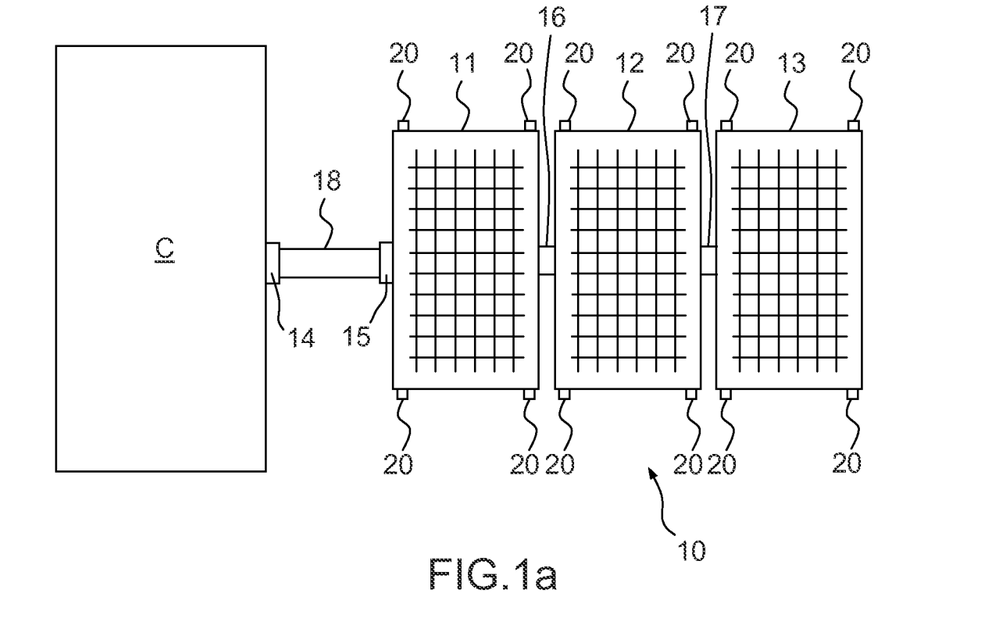
FIGS. 1a and 1b show a panel structure in the deployed position in the case of FIG. 1a and in the furled position in the case of FIG. 1b.
Figure 1B:
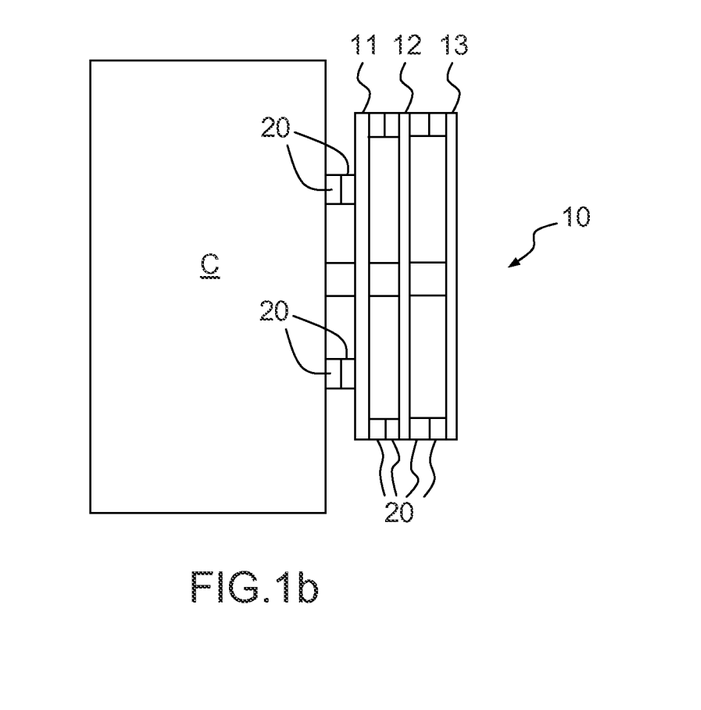

FIGS. 1a and 1b show a structure 10 comprising three panels 11, 12 and 13 intended to equip a satellite the body of which bears the reference C. These may be, for example, solar panels intended to supply the electrical energy needs of the satellite or alternatively antenna panels intended to transmit or receive telecommunications signals. The structure has a number of articulations allowing it to be deployed. More specifically, when the satellite is launched, the panels 11, 12 and 13 are furled against one another as depicted in FIG. 1b and once the satellite has reached its position in space, the panels are deployed. To this end, the structure in the example shown comprises four articulations 14, 15, 16 and 17. The articulation 14 connects an arm 18 of the structure 10 to the body C of the satellite in which notably electronic equipment is installed. The articulation 15 connects the arm 18 to the panel 11, the articulation 16 connects the panels 11 and 12 and the articulation 17 connects the panels 12 and 13. The panels 11, 12 and 13 are flat and rectangular. They extend in the plane of FIG. 1a in the deployed position. The articulations 14, 15, 16 and 17 have a degree of freedom to rotate and this allows the panels 11, 12 and 13 to be concertina-folded against one another. The articulations are advantageously self-propelled, as described for example in patent applications FR 2 635 077 and FR 2 902 763.

As explained above, during launch, the satellite is subjected to severe mechanical stresses such as significant vibrations. To prevent the panels in their furled position from knocking together during the launch and, more generally, when subjected to mechanical stresses, the structure 10 comprises spacers secured to the panels 11, 12 and 13 and acting as buffers. In the example shown, each of the panels is equipped with four knock prevention devices 20. The knock prevention devices also act as spacers in order to keep the various panels 11, 12 and 13 some distance apart. The knock prevention devices 20 are advantageously identical so that the mass-production thereof can be standardized. A knock prevention device 20 is mounted at each of the corners of a panel. In the furled position, a knock prevention device 20 of a panel butts against another knock prevention device 20 of the adjacent panel. The knock prevention devices 20 can also act as buffers between a panel and the body of the satellite. The number of knock prevention devices 20 may be greater. It is defined according to the dimensions of the panels, their rigidity and the mechanical stresses they have to be able to withstand. It is equally possible to lay out the knock prevention devices 20 in such a way that a knock prevention device 20 fixed to one panel can bear directly against the adjacent panel. One function of the knock prevention devices 20 is to space the panels apart, that is to say to keep the panels some distance apart when the structure is in the furled position. Another function of the knock prevention devices 20 is to damp any forces that a panel may exert on its neighbor, notably when the structure is subjected to vibrations, this being notably the case during launch for a structure equipping a satellite.

Figure 2A:
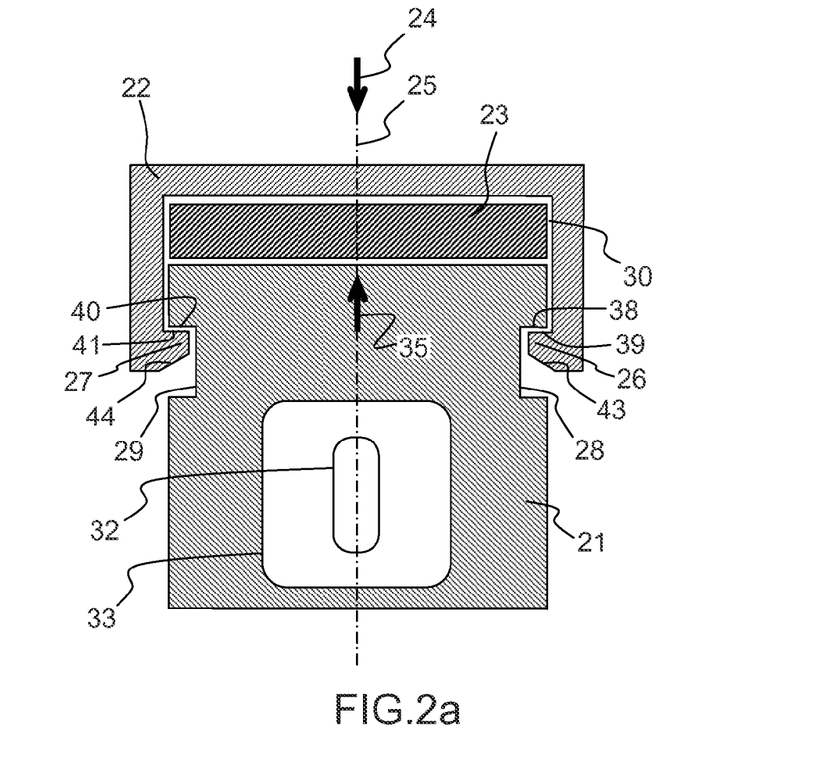
FIGS. 2a and 2b show a first embodiment of a knock prevention device fixed to one of the panels of the structure according to the invention.
Figure 2B:
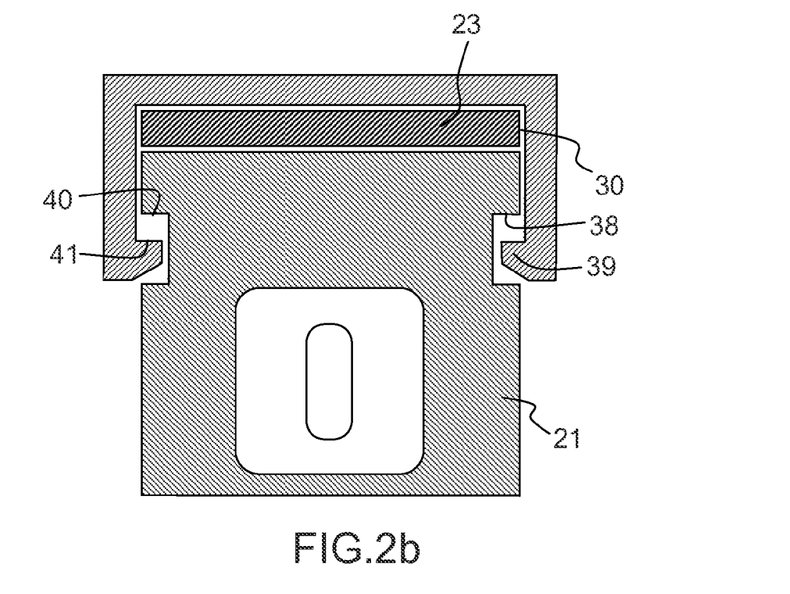

FIGS. 2a and 2b show a first embodiment of a knock prevention device 20 according to the invention. The knock prevention device 20 comprises a holder 21 intended to be fixed to a first panel, for example the panel 11, a cap 22 forming a buffer against which a second panel adjacent to the first panel 11, for example the panel 12, can bear, and a damper 23. The second panel 12 bears against the cap 22 in a bearing direction 24 coincident with an axis 25.

In the example shown, the cap 22 comprises two lugs 26 and 27. The holder 21 comprises two housings 28 and 29. The housing 28 is intended to receive the lug 26 and the housing 29 is intended to receive the lug 27. The cap 22 is configured such that one of the lugs passes into one of the housings by elastic deformation of the cap 22.

Each of the two housings 28 and 29 is associated with one of the two lugs 26 and 27. The two housings 28, 29 and the two lugs 26, 27 are symmetrical with respect to the axis 25 coincident with the bearing direction 24.

The invention can be implemented with a single lug made on the cap 22 that is associated with a single housing made in the holder 21. It is also possible to provide more than two lugs, each associated with a housing.

In the example shown, the lug(s) are made on the cap 22 and the housing(s) are made in the holder 21. It is also possible to reverse the housings and lugs. In other words, the lug(s) can be made on the holder 21 and the housing(s) can be made in the cap 22.

The damper 23 is disposed in a space 30 formed between the holder 21 and the cap 22.

In order to fix the holder 21 to its panel, the holder 21 has a hole 32 through which the shank of a screw or of a rivet can be passed. A head of the screw or of the rivet can be concealed in a counterbore 33 in the holder 21. The rivet or the screw is fixed to the corresponding panel. The hole 32 and the counterbore form an example of means for fixing the device 20 to the first panel. These means are advantageously adjustable in the direction 25. In order to carry out this adjustment, the hole 32 is for example oblong, as shown in FIGS. 2a and 2b. Adjustment is carried out prior to the tightening of the screw (or of the rivet) passing through the hole 32. The adjustment makes it possible to improve the spacing apart of the panels when they are furled in the position in FIG. 1b. The position of the device 20 is adjusted such that the device 20 exerts a slight pressure on the opposing panel. The damper 23 is thus slightly compressed when the structure 10 is at rest. This preload prevents the cap 22 from coming away from the adjacent panel when the structure 10 is subjected to slight vibrations.

Advantageously, the holder 21 and the cap 22 are configured to allow the cap 22 to move in translation with respect to the holder 21 when the lugs 26, 27 are disposed in their respective housings 28, 29. The movement in translation is in the bearing direction 24 and makes it possible to reduce the volume of the space 30 so as to allow the damper 23 to act. The damper 23 is formed for example from a block of flexible material configured to deform under the effect of the second panel 12 bearing against the cap 21. The damper 23 is formed for example from a one-piece elastomer material.

The movement in translation of the cap 22 in the direction 24 makes it possible to compress the damper 23. FIG. 2b shows the damper 23 compressed between the cap 22 and the holder 21. The elastomer chosen may have different mechanical properties. A material having simple elastic properties can be chosen. The compression of the damper 23 thus brings about a simple proportional reaction to the force to which the cap 22 is subjected. It is also possible to choose a material having energy absorption properties so that a part of the impact energy between the panels is absorbed. In this type of material, the impact energy is then dissipated in the form of heat.

Advantageously, the lugs 26, 27 and the associated housings 28, 29 are configured to limit the movement in translation of the cap 22 with respect to the holder 21 in an opposite direction 35 to the bearing direction 24. Limiting the movement in translation in the direction 35 makes it possible to retain the cap 22. This limitation of the movement in translation is ensured in the embodiment shown in FIGS. 2a and 2b. More specifically, the housing 28 comprises a face 38 substantially perpendicular to the axis 25, it being possible for a face 39 of the lug 26 to bear against said face 38. When the knock prevention device 20 comprises two lugs and associated housings, the various pairs of lugs and associated housings can comprise similar faces that come into contact simultaneously. In FIG. 2a, the faces 38 and 39 are in contact with one another. Similarly, the housing 29 comprises a face 40 substantially perpendicular to the axis 25, a face 41 of the lug 27 bearing against said face 40.

In FIG. 2b, when a pressure is exerted on the cap 22 in the bearing direction 24, the faces 38 and 39, on the one hand, and 40 and 41 come apart, making it possible for the cap 22 to move in translation. When the pressure exerted on the cap 22 is released, the damper 23 pushes the cap 22 back in the direction 35 and the movement of the cap 22 in the direction 35 is limited when the faces 38 to 41 come into contact with one another.

Advantageously, the lugs 26 and 27 and the corresponding housings 28 and 29 are configured so as to allow the damper 23 to be preloaded when the lugs 26 and 27 are disposed in their respective housings 28 and 29. This configuration is obtained by adapting the dimensions of the holder 21, of the cap 22 and of the damper 23 along the axis 25. This preload requires a force on the cap 22 in the bearing direction 24 in order to position the lugs 26 and 27 in their respective housings 28 and 29. Once the lugs 26 and 27 are in their respective housings 28 and 29, this preload makes it possible at least to ensure, when there is no bearing load on the cap 22, a certain contact between the faces 38 and 39, on the one hand, and 40 and 41, on the other hand, regardless of the manufacturing tolerances along the axis 25 of the three mechanical parts that form the knock prevention device 20, the holder 21, the cap 22 and the damper 23. It is also possible to increase this preload depending on other operating constraints of the structure 20.

The lugs 26 and 27 may comprise inclined faces, 43 and 44, respectively, making it easier to fit the cap 22. More specifically, the cap 22 is mounted on the holder 21 by moving the cap 22 in translation in the bearing direction 24. The lugs 26 and 27 come into contact with the damper 23 and then with the holder 21. This contact is made at the inclined faces 43 and 44, which tend to space apart the lugs 26 and 27 perpendicularly to the axis 25 by elastic deformation of the cap 22. When the lugs 26 and 27 reach their respective housings 28 and 29, the lugs 26 and 27 return to their original positions with respect to the cap 22 by virtue of the elasticity of the cap 22.

Figure 3A:
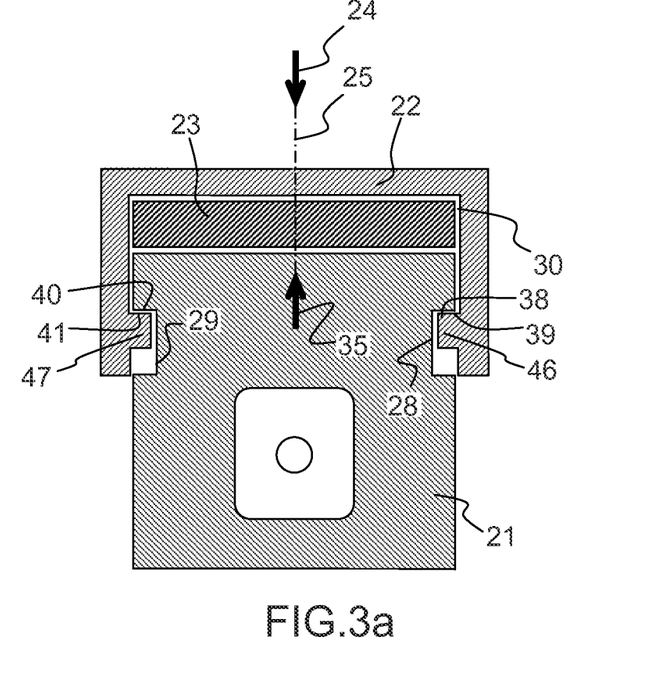
FIGS. 3a and 3b show a second embodiment of a knock prevention device fixed to one of the panels of the structure according to the invention.
Figure 3B:
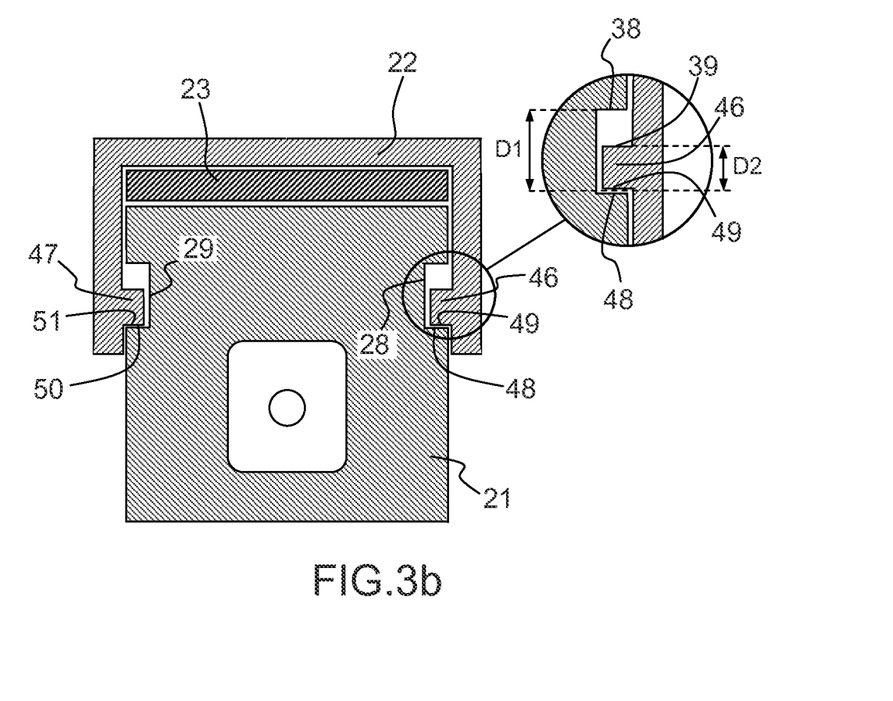

FIGS. 3a and 3b show a second embodiment of a knock prevention device 20. The holder 21, the cap 22 and the damper 23 are shown once again. The lugs of the cap 22 are different and in this case bear the references 46 and 47. In this embodiment, the housing 28 is intended to receive the lug 46 and the housing 29 is intended to receive the lug 47. The lugs 46, 47 and the housings 28, 29 are configured to limit the movement in translation of the cap 22 with respect to the holder 21 in the direction 35, as before and in the bearing direction 24. Limiting the movement in translation in the bearing direction 24 makes it possible to limit the compression of the damper 23.

In this second embodiment, it is possible to see once again the preload described in the first embodiment. Furthermore, it is clear that the limitations of movement in translation of the cap 22 in the directions 24 and 35 and the preload can be implemented regardless of the number of lug/housing pairings.

In order to limit the movement in translation in the direction 35, a face 39 belonging to the lug 46 that can bear against the face 38 of the housing 28 and also a face 41 belonging to the lug 47 that can bear against the face 40 of the housing 28 are found once again in the second embodiment. These two bearing positions are visible in FIG. 3a.

In order to limit the movement in translation in the bearing direction 24, the lug 46 comprises a face 49 which is substantially parallel to the face 39 and can bear against a face 48 of the housing 28. The face 48 is substantially parallel to the face 38. Similarly, the lug 47 comprises a face 51 which is substantially parallel to the face 41 and can bear against a face 50 of the housing 29. The face 50 is substantially parallel to the face 40.

In other words, the housing 28 comprises two faces 38 and 48 that more or less face one another and separated by a first distance D1 extending in a direction 25 coincident with the bearing direction 24, it being possible for the lug 46 to bear against one or the other of the two faces 38 and 48. In order not to overload the figure, the direction coincident with the bearing direction 24 is parallel to the axis 25 and bears the same reference. A corresponding second distance D2 of the lug 46 is less than the first distance D1, the second distance D2 being defined between the two faces 39 and 49 of the lug 46 that are intended to each bear alternately against one of the faces 38 and 48 of the housing 28. The distances D1 and D1 are shown in a partially enlarged view of the lug 46 inside the housing 28. The distances D1 and D2 apply also to the lug 47 and the housing 29. Distances are referred to as corresponding on account of their same direction, in this case the direction 25.

The parallelism of the different faces may be approximate. It is sufficient for the different faces to be able to bear against one another. Similarly, a direction perpendicular to the bearing direction 24 can be substantially offset angularly from the direction 25.

Figure 4:
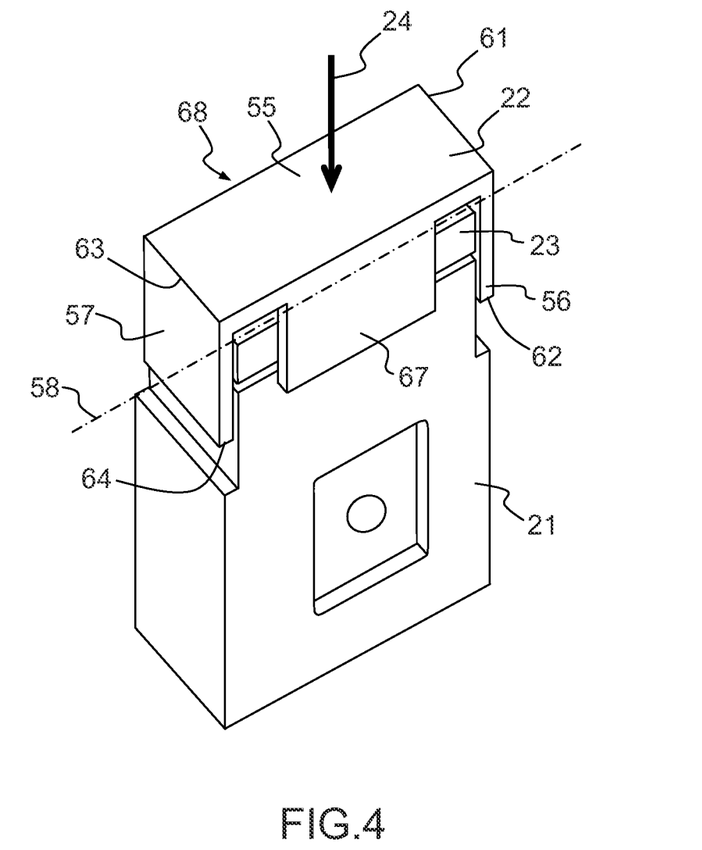
FIG. 4 shows the knock prevention device from FIGS. 3a and 3b in perspective.
Figure 5:
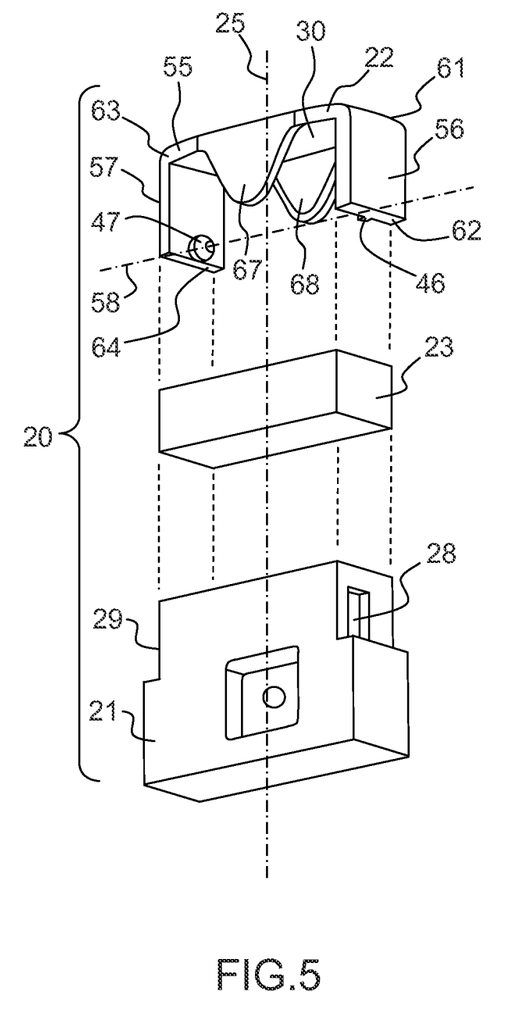
FIG. 5 shows an exploded view of the knock prevention device from FIGS. 3a and 3b.

FIGS. 4 and 5 show the knock prevention device 20 in perspective. In FIG. 4, the device is mounted in the position of FIG. 2a or 3a. In FIG. 5, the device is shown in an exploded view. These two figures make it possible notably to see an example of the shape of the lug and of the associated housing.

The cap 22 advantageously comprises a first plate 55 which is perpendicular to the bearing direction 24 and against which the second panel 12 bears, two second plates 56 and 57 which are perpendicular to the first plate 55 and are able to deform elastically so as to allow the lugs 46 and 47 to pass into their respective housings 28 and 29, the elastic deformation of the second plates 56 and 57 taking place in a direction 58 parallel to the first plate 55. In the embodiment shown, the lugs 46 and 47 are secured to each of the second plates 56 and 57. The plates 55, 56 and 57 and also the lugs 46 and 47 are advantageously made in one piece.

The cap 22 is made for example of plastics material which may be molded. By way of an alternative, for shorter production runs, the cap 22 could be produced by the three-dimensional polymerization of a resin, the polymerization being brought about from a numerical model of the cap 22. Such a method of manufacture is also known by the English-language term of "direct manufacturing". If the invention is to be used on board a satellite, use may for example be made of a polyether ether ketone also known by its abbreviation PEEK. This material has good mechanical properties compatible with a harsh environment such as that of space. This material has notably good elasticity allowing the plates 56 and 57 to deform in their elastic range so as to be able to fit the lugs 46 and 47 in their respective housings 28 and 29.

The faces 39 and 49 for the lug 46 and the faces 41 and 51 for the lug 47 may have different areas. Specifically, the faces 39 and 41 only serve to retain the cap 22 in position on the holder 21, by enclosing the damper 23 in the space 30. The force for retaining the cap 22 may be weak and only depends on the geometry of the components 21, 22 and 23 of the knock prevention device 20. By contrast, the faces 49 and 50 may absorb much greater forces, in addition to the compression of the damper 23. These forces depend on the impacts which the knock prevention device 20 can absorb. Advantageously, the faces 49 and 51 are prolonged such that their area is greater than the respective areas of the faces 39 and 41.

More specifically, the second plates 56 and 57 each extend between two ends 61, 62 for the plate 56, and 63, 64 for the plate 57. For each of the two plates 56 and 57, a first of the two ends 61 or 63 is fixed to the first plate 55, the lug 46 or 47 is fixed to a second of the two ends 62 or 64. The face 49 or 51 of the lug 46 or 47 lies in the continuation of the second end 62 or 64 of the second plate 56 or 57 so as to increase the area of the cap 22 bearing against the holder 21 in order to limit the movement in translation in the bearing direction 24.

In FIGS. 4 and 5, the lugs 46 and 47 have a circular section and extend in the direction 58. The faces 39, 41, 49 and 51 are in practice each reduced to a line parallel to the direction 58. For the faces 39 and 41 to press, substantially linear pressure may be sufficient to retain the cap in the direction 35. By contrast, in order to limit the movement in translation of the cap 22 in the direction 24, the end 26, for the lug 56, and the end 64, for the lug 57, respectively extend the lines that form the faces 49 and 51, so as to increase the areas of the bearing surfaces of the lugs 46 and 47 against the holder 21.

Advantageously, the cap 22 comprises two third plates 67 and 68 which are perpendicular to the first plate 55 and to the second plates 56 and 57. The third plates 67 and 68 delimit the space 30 containing the damper 23. The plates 67 and 68 make it possible to contain the damper 23 so as to prevent it from escaping from the space 30 reserved therefor. In FIG. 4, the plates 67 and 68 have a substantially rectangular contour and in FIG. 5, the plates 67 and 68 have a substantially triangular contour. In the position of FIGS. 2a and 3a, that is to say when there is no pressure on the cap 22 in the direction 24, the plates can partially cover the holder 21 in order to locally close the space 30. It is not necessary for the plates 67 and 68 to extend entirely between the plates 56 and 57. It is possible to leave the space 30 partially open between the plates 67, 68 and the plates 56 and 57.

The invention claimed is:

1. A structure comprising at least two unfurling panels and a knock prevention device intended to prevent the panels from knocking together when they are furled against one another, wherein the knock prevention device comprises a holder fixed to the first panel, a cap forming a buffer against which the second panel bears in a bearing direction, and a damper disposed in a space formed between the holder and the cap, wherein the cap and the holder form two elements, in that a first of the two elements comprises at least one lug, wherein the second of the two elements comprises at least one housing intended to receive the lug, and wherein the cap is configured such that the lug passes into the housing by elastic deformation of the cap, such that the elastic deformation of the cap for placement of the lugs is carried out in a direction mainly perpendicular to the bearing direction;

wherein the structure further comprises two housings and two lugs, each of the two housings being associated with one of the two lugs, the two housings and the two lugs being symmetrical with respect to an axis coincident with the bearing direction; and wherein the cap has a first plate which is perpendicular to the bearing direction and against which the second panel bears, two second plates which are perpendicular to the first plate and are able to deform elastically so as to allow the lugs to pass into their respective housings, the elastic deformation of the second plates taking place in a direction parallel to the first plate.

2. The structure according to claim 1, wherein the holder and the cap are configured to allow the cap to move in translation with respect to the holder when each lug is disposed in each respective housing, and in that the movement in translation is in the bearing direction and makes it possible to reduce the volume of the space so as to allow the damper to act.

3. The structure according to claim 2, wherein the lugs and the housings are configured to limit the movement in translation in an opposite direction to the bearing direction.

4. The structure according to claim 3, wherein the lugs and the housings are configured to limit the movement in translation in the bearing direction.

5. The structure according to claim 4, wherein each housing comprises two faces that face one another and are separated by a first distance that extends in a direction coincident with the bearing direction, each lug being able to bear against one or the other of the two faces, and wherein a second distance corresponding to each lug is less than the first distance, the second distance being defined between two faces of each lug that are each intended to bear alternately against one of the faces of each respective housing.

6. The structure according to claim 1, wherein the damper is formed from a block of flexible material that is configured to deform under the effect of the second panel bearing against the cap.

7. The structure according to claim 6, wherein the damper is formed from a one-piece elastomer material.

8. The structure according to claim 1, wherein the lugs and the housings are configured so as to allow the damper to be preloaded when the lug is disposed in the housing.

9. The structure according to claim 1, wherein the second plates each extend between two ends, wherein, for each of the two second plates, a first of the two ends is fixed to the first plate, in that the lugs are respectively fixed to a second of the two ends, in that the lugs each comprise a face that is intended to bear against one of the faces of the corresponding housing so as to limit the movement in translation in the bearing direction, and wherein the face of each lug lies in the continuation of the second end of the respective second plate so as to increase the area of the cap bearing against the holder in order to limit the movement in translation in the bearing direction.

10. The structure according to claim 1, wherein the cap comprises two third plates which are perpendicular to the first plate and second plates, the third plates delimiting the space containing the damper.

11. The structure according to claim 1, wherein the knock prevention device comprises means for fixing to the first panel that are adjustable in a direction coincident with the bearing direction.

12. The structure according to claim 1, wherein the cap forms a single mechanical part.

* * * * *